(12) United States Patent
Auman

(10) Patent No.: US 7,841,154 B2
(45) Date of Patent: *Nov. 30, 2010

(54) ASSEMBLY OF A STRUCTURAL COMPONENT HAVING KEYED SURFACES

(76) Inventor: Barney J. Auman, 20 Canyon Cove Dr., Logan, UT (US) 84321

( * ) Notice: Subject to any disclaimer, the term of this patent is extended or adjusted under 35 U.S.C. 154(b) by 1351 days.

This patent is subject to a terminal disclaimer.

(21) Appl. No.: 11/305,453

(22) Filed: Dec. 16, 2005

(65) Prior Publication Data

US 2006/0090417 A1 May 4, 2006

Related U.S. Application Data

(63) Continuation-in-part of application No. 10/696,605, filed on Oct. 30, 2003, now Pat. No. 7,275,349.

(51) Int. Cl.
*E04C 3/29* (2006.01)
*E04C 3/20* (2006.01)

(52) U.S. Cl. ............... 52/848; 52/847; 52/844; 52/836; 52/514; 52/514.5; 138/157; 138/158; 156/60

(58) Field of Classification Search ............... 52/800.1, 52/800.11, 800.12, 801.1, 802.1, 802.11, 52/632, 581, 588.1, 514, 514.5, 800, 835–836, 52/843, 844, 845, 847–848, 745.17; 264/311, 264/338, 41, 255, 45.7, 276; 138/156–158, 138/162, 166, 168, 170; 156/71; 428/33; 285/331, 373; 405/216

See application file for complete search history.

(56) References Cited

U.S. PATENT DOCUMENTS

| 1,999,098 | A | * | 4/1935 | Hillyer et al. | ............... 52/98 |
| 3,312,028 | A | | 4/1967 | Schroyer | |
| 3,624,270 | A | * | 11/1971 | Turner | ............... 174/87 |
| 3,708,943 | A | | 1/1973 | Thomas et al. | |
| 4,760,682 | A | * | 8/1988 | King | ............... 52/844 |
| 4,955,156 | A | * | 9/1990 | Williams | ............... 47/32.7 |
| 5,014,487 | A | * | 5/1991 | King | ............... 52/844 |
| 5,661,925 | A | * | 9/1997 | MacMaster | ............... 47/32.4 |
| 2001/0022056 | A1 | | 9/2001 | Gifford | |

\* cited by examiner

*Primary Examiner*—Jeanette Chapman
(74) *Attorney, Agent, or Firm*—Jeffery M. Lillywhite, PC

(57) ABSTRACT

Systems and methods for assembling multi-piece structural components, such as architectural columns, capitals, and bases, are disclosed. In one embodiment a column assembly is disclosed, comprising a first column portion and a second column portion. The first column portion includes a flange having a first keyed surface on which predetermined surface features are defined. The second column portion includes a second keyed surface that is configured to engage the first keyed surface. The second keyed surface includes a keying material having surface features that intermesh with the predetermined surface feature such that the first and second column portions are desirably aligned when mated. The surfaces features of the second keyed surface are defined in the keying material as a result of compressive engagement between the keying material and the predetermined surface features of the first keyed surface when the column portions are mated.

13 Claims, 10 Drawing Sheets

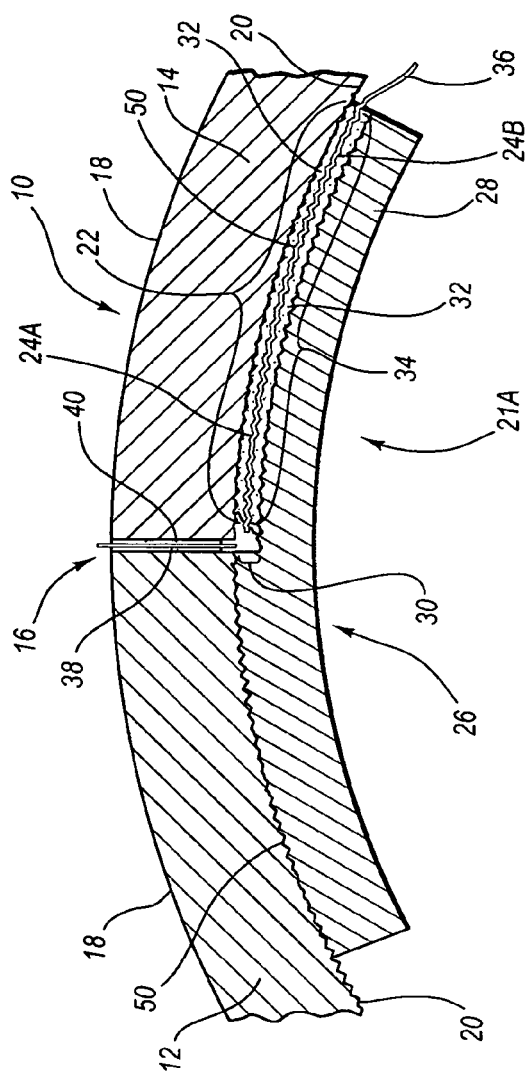
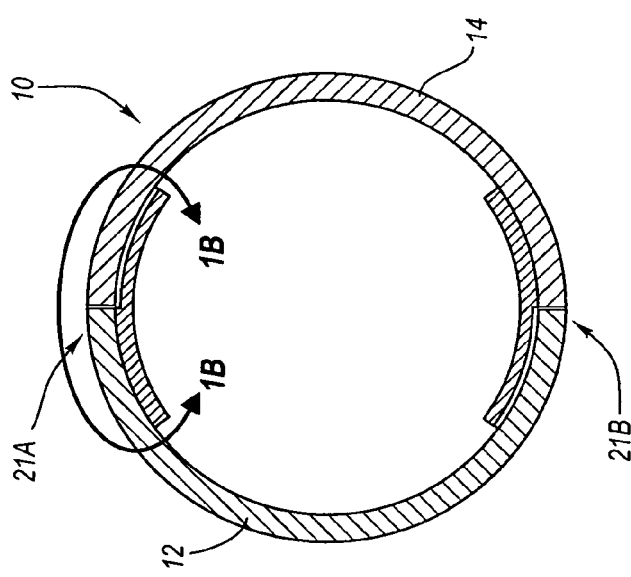
Fig. 1B
Fig. 1A

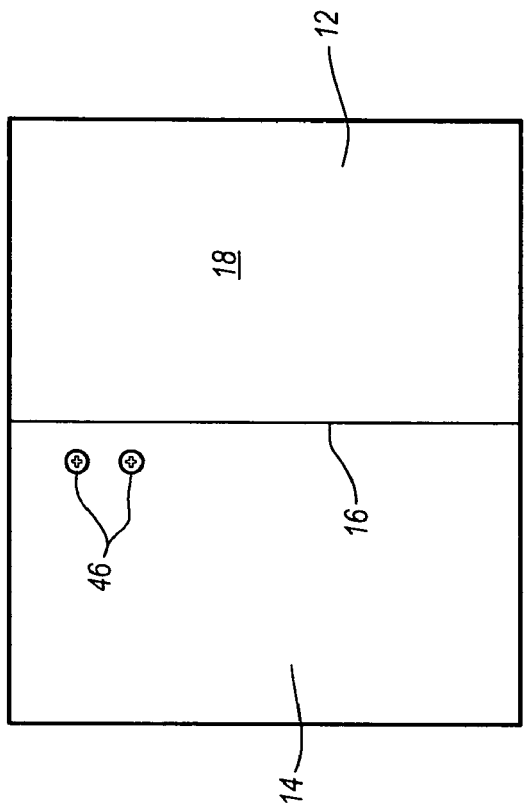
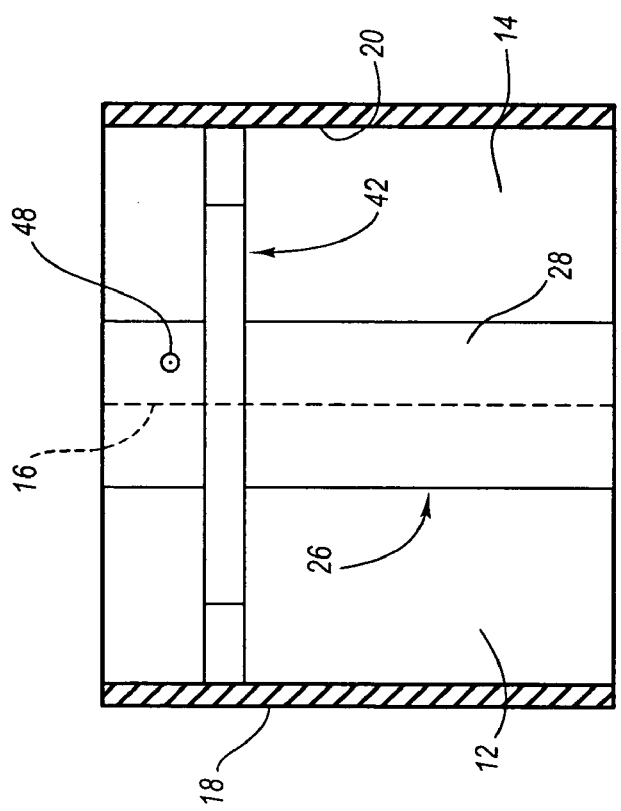
Fig. 2C
Fig. 2B

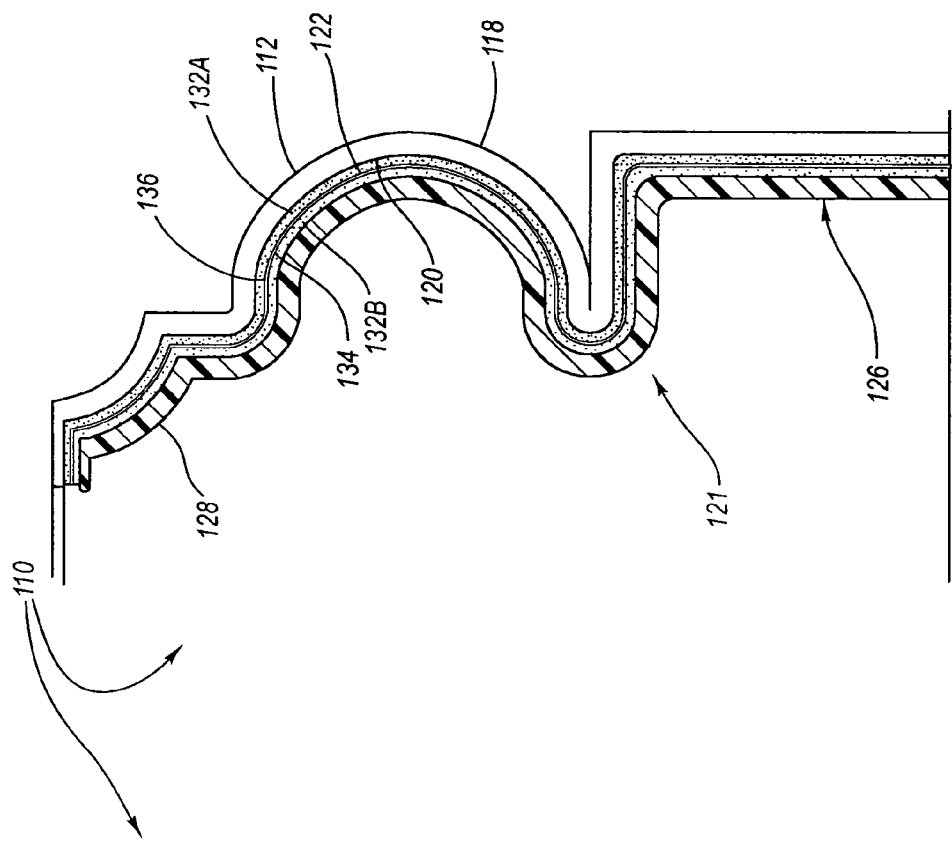
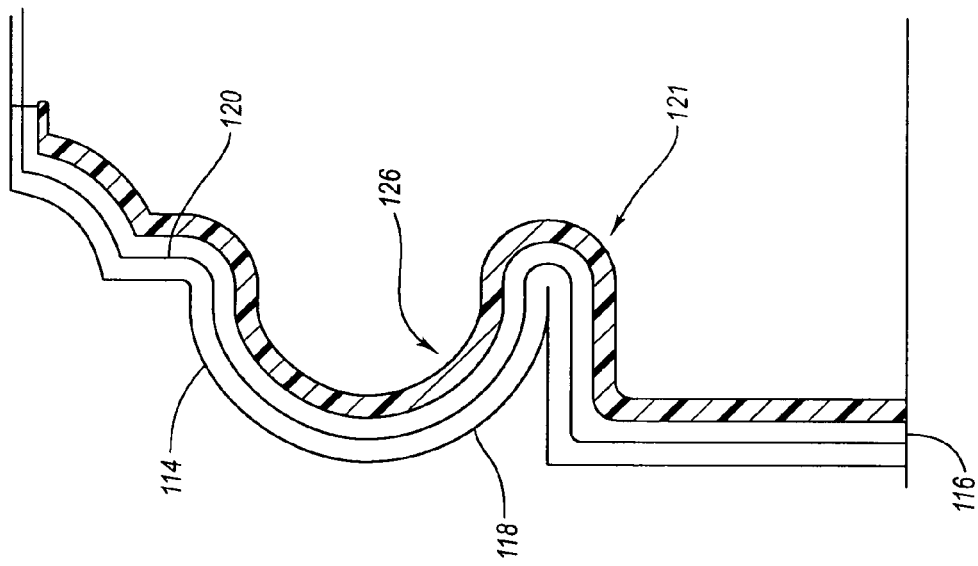
Fig. 3B

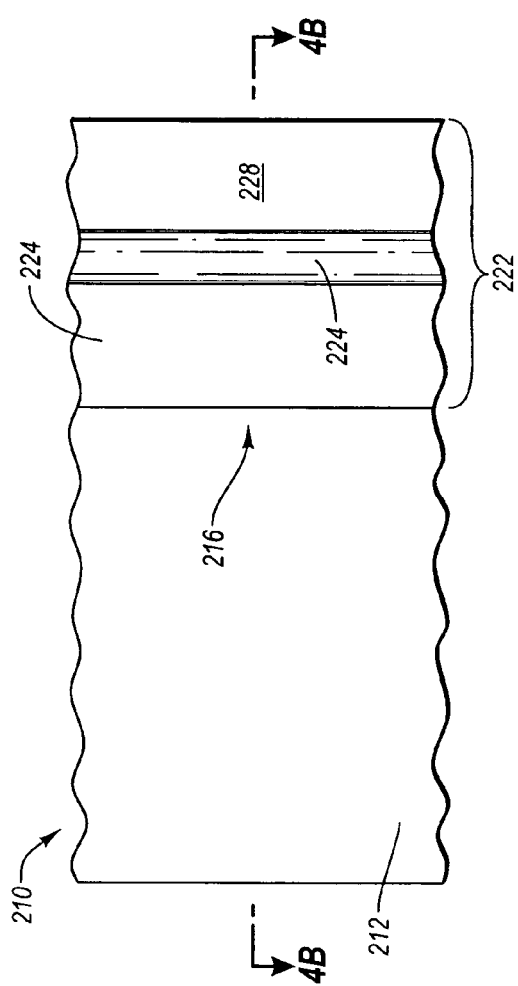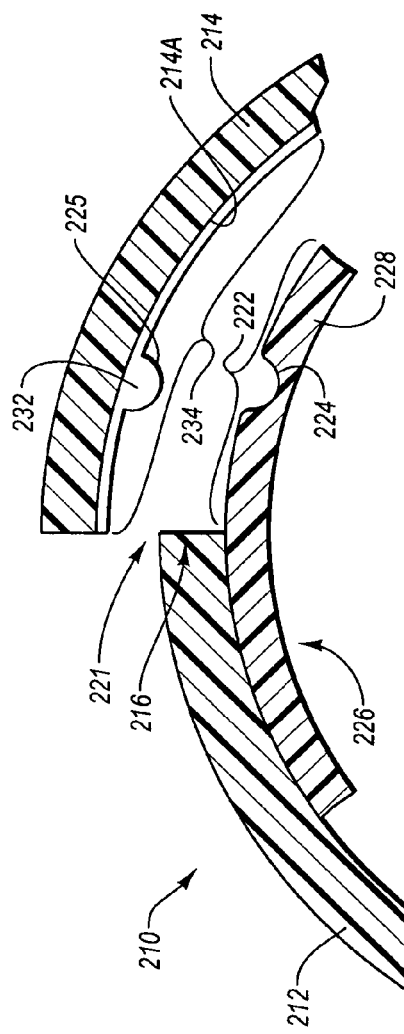
Fig. 4A
Fig. 4B

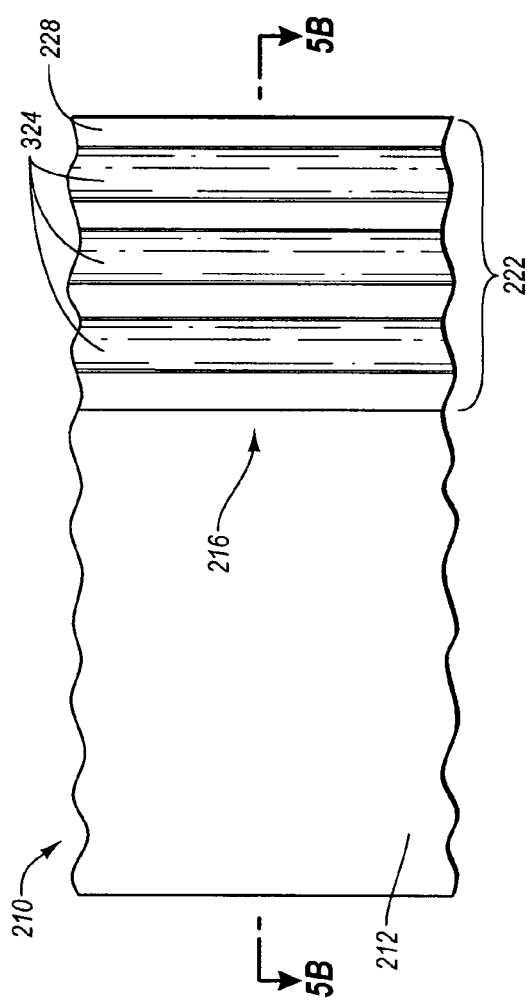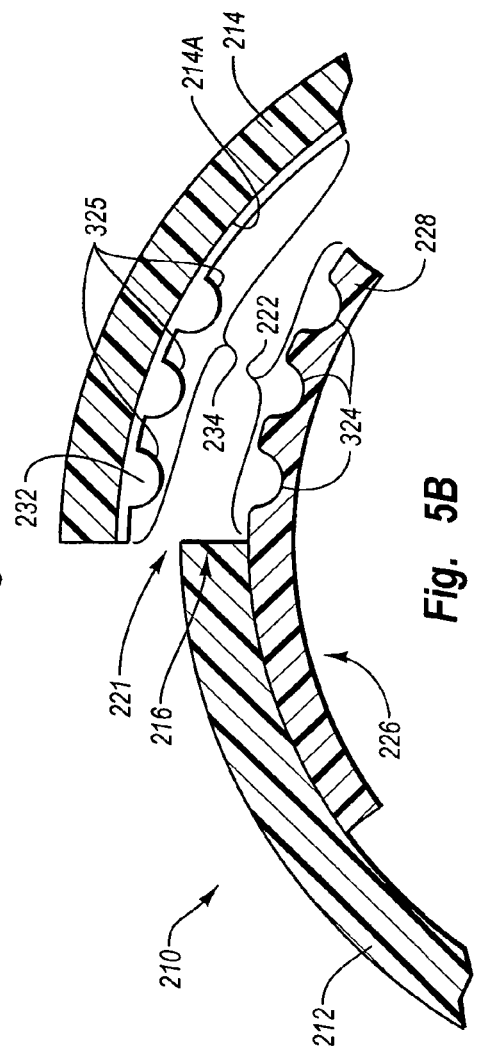

ASSEMBLY OF A STRUCTURAL COMPONENT HAVING KEYED SURFACES

CROSS-REFERENCE TO RELATED APPLICATIONS

This application is a continuation-in-part of application Ser. No. 10/696,605, entitled "SYSTEMS AND METHODS FOR ASSEMBLY OF A STRUCTURAL COMPONENT," filed Oct. 30, 2003, now U.S. Pat. No. 7,275,349 which is incorporated herein by reference in its entirety.

BACKGROUND

1. Technology Field

The present invention generally relates to architectural structures including bases, columns, and capitals. More particularly, the present invention relates to multi-piece architectural component systems that can be disassembled and reassembled in precise configurations so as to preserve the integrity and appearance of the structure.

2. The Related Technology

Various architectural components are employed in homes and commercial buildings for a variety of reasons, including enhancement of their appearance, structural integrity, etc. Examples of such components include columns with their corresponding bases and capitals, domes, etc.

Many such architectural components can be manufactured so as to be integrated into or around existing structures or features of the building. For example, columns are often installed as to surround a pre-existing, load bearing post or beam. To enable such an installation, the column must be separated along its length into at least two pieces to enable the column to surround the post or beam. This also holds true for the base and capital that often accompany the column.

A typical result of separating the column as discussed above is two or more column pieces that fail to easily align when brought together around the post. This difficulty in alignment results from various factors, including warping. As such, the joints between the column pieces are typically characterized by uneven edges, gaps, etc. Though such joint defects can be compensated for by various cosmetic procedures, undesired time and costs are nevertheless expended in employing craftsmen to correct such defects. Moreover, such cosmetic procedures fail over time, resulting in cracks and unsightly appearances for the column.

BRIEF SUMMARY

The present invention has been developed in response to the above and other needs in the art. Briefly summarized, embodiments of the present invention are directed to systems and methods for providing multi-piece architectural structures that can be assembled such that the joints between each piece are aligned in a desired configuration with respect to one another, thereby providing the architectural structure with superior appearance and integrity, all while reducing assembly time for the structure.

In one embodiment a multi-portion column assembly is disclosed, comprising a first column portion and a second column portion that together define an interface; an inner surface of the second column portion including a first plurality of surface features adjacent the interface; a backing member included on the second column portion, the backing member including a flange that extends across the interface such that the flange is proximate the first plurality of surface features; and a keying material positioned on the flange, the keying material including a second plurality of surface features that cooperatively intermeshes with the first plurality of surface features when the first and second column portions are mated such that a desired alignment between the first and second column portions is achieved.

In another embodiment, a method for configuring a multi-portion column for assembly is disclosed. In this method, first and second column portions are defined, wherein the second column portion includes an inner surface. A backing member is defined on the first column portion such that a flange of the backing member is positioned proximate the second column portion inner surface, then a pliable keying material is applied to the flange and the inner surface. The flange and inner surface are brought into proximity such that first and second pluralities of surface features are defined in the respective keying materials, wherein the surface features are capable of intermeshing with one another such that the first and second column portions can be positioned in a desired respective orientation when the first and second pluralities of surface features are mated.

In yet another embodiment, predetermined, non-random surface features are correspondingly included on the flange and inner surface of the respective column portions to enable mating of the column portions in a desired orientation. Preferably, the surface features are first durably defined on either the flange or inner surface. Keying material is placed on the other opposing surface. The two surfaces are then brought together such that the durable, pre-defined surface features of one surface are imprinted into the pliable keying material of the other surface. This produces inversely matching surfaces on each column portion, which in turn enables intermeshing of the column portions to occur, thereby mating the column portions in a desired orientation with respect to one another. A variety of surface feature styles, shapes, and configurations can be employed in a column alignment system according to the present embodiment.

These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof that are illustrated in the appended drawings. It is appreciated that these drawings depict only typical embodiments of the invention and are therefore not to be considered limiting of its scope. The invention will be described and explained with additional specificity and detail through the use of the accompanying drawings in which:

FIG. 1A is a cross sectional view of an architectural column assembly including a column alignment and attachment system, according to one embodiment of the invention;

FIG. 1B is a close-up view of a portion of the cross sectional column of FIG. 1A, taken about the circumference 1B-1B;

FIG. 2B is a view of an interior portion of the column assembly of FIG. 2A, taken along the line 2B-2B of FIG. 2A;

FIG. 2C is a view of an exterior portion of the column assembly of FIG. 2A, taken along the line 2C-2C;

FIG. 3B is a cross sectional side view of the architectural base assembly of FIG. 3A, depicting one stage of a method for aligning and attaching the base assembly together;

FIG. 4A is a side view of a portion of a column assembly including features according to one embodiment of the present invention;

FIG. 4B is a cross sectional view of a portion of the column assembly, taken along the line 4B-4B of FIG. 4A;

FIG. 5A is a side view of a portion of a column assembly including features according to another embodiment of the present invention;

FIG. 5B is a cross sectional view of a portion of the column assembly, taken along the line 5B-5B of FIG. 5A;

DETAILED DESCRIPTION OF SELECTED EMBODIMENTS

Figure 2A:
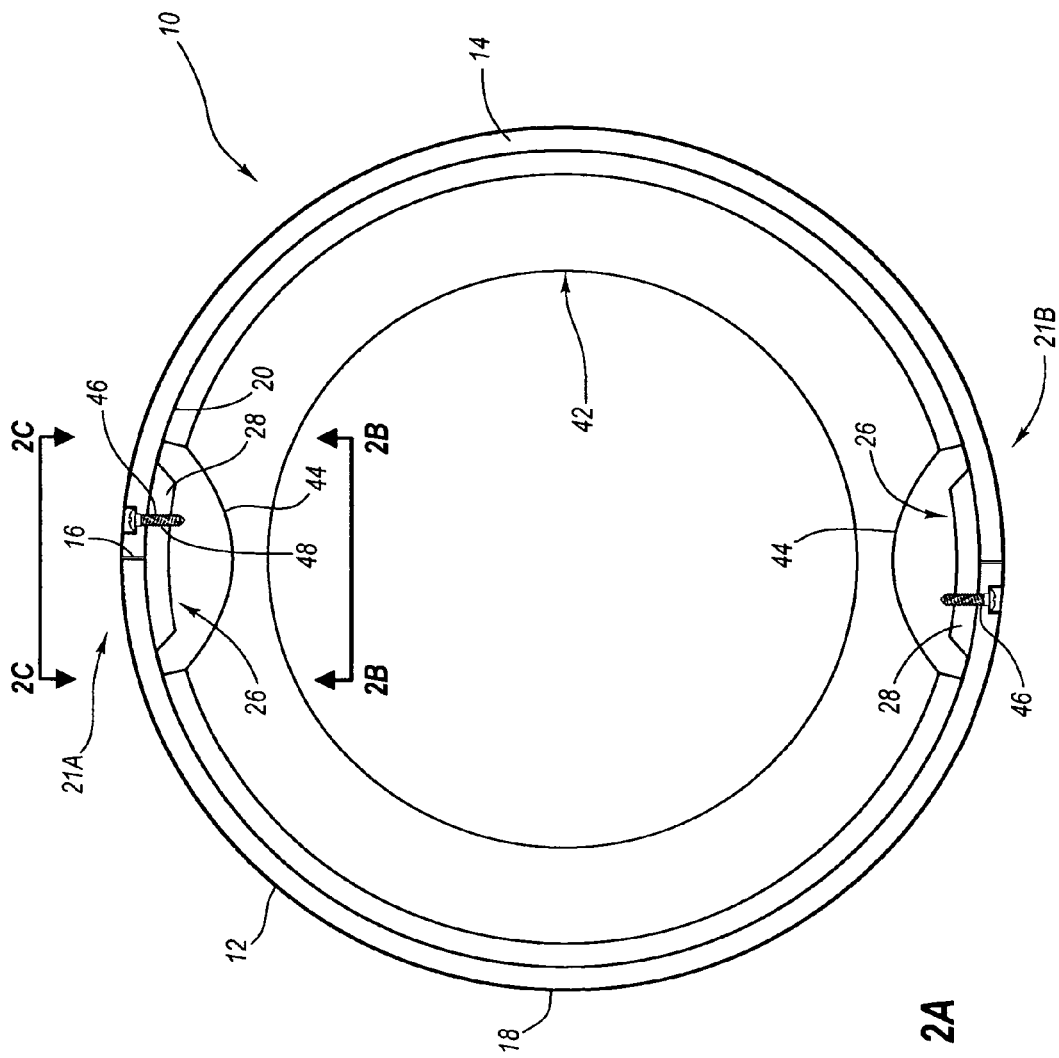
FIG. 2A is a cross sectional view of an architectural column assembly including a column alignment and attachment system, according to one embodiment.

Reference will now be made to figures wherein like structures will be provided with like reference designations. It is understood that the drawings are diagrammatic and schematic representations of exemplary embodiments of the invention, and are not limiting of the present invention nor are they necessarily drawn to scale.

FIGS. 1-10 depict various features of embodiments of the present invention, which is generally directed to a system for aligning and assembling multi-piece architectural structures, including columns, bases, and capitals, as well as other suitable multi-piece structures. Also disclosed is a method by which the system for aligning and assembling such structures can be practiced. Embodiments of the present invention enable the assembly of columns, bases, capitals and other structures in a manner such that a desired alignment is achieved between the various pieces, resulting in a superior structural integrity and appearance for the structure. The joints between the pieces of the structure are aligned and clean, obviating the need for significant joint reconditioning after assembly is complete and hastening assembly time. The resulting joints are also stronger relative to known joining methods, which translates into reduced joint cracking over time. Overall on-site installation is also reduced as a result of practice of embodiments of the present invention as described herein.

As used herein, "structural component" and "architectural component" are understood to include components used in or relating to a home, commercial building or other structure, including load bearing and non-load bearing components that in whole or in part define a portion of the structure.

Reference is first made to FIG. 1A, which depicts a cross sectional view of a portion of a column assembly, generally designated at 10. The column assembly 10 generally defines a hollow cylinder and is suitable for surrounding another structure, such as a load bearing post in a building, e.g., a home, commercial edifice, etc. While often used for decorative purposes, the column assembly 10 can also fill a load bearing purpose in some embodiments. The column assembly 10 is also often placed in cooperation with a base at a lower portion of the column assembly, and with a capital (not shown) at an upper portion thereof.

As shown in FIG. 1A, the column assembly 10 includes a first column portion 12 and a second column portion 14. First and second column portions 12 and 14 here define half cylinders that mate to define together the column assembly 10. Though they may be initially formed as a single piece or as separate pieces, the column portions 12 and 14 are at some stage during the column manufacturing and assembly process defined as separate pieces, as shown. Also, though two column portions are shown as defining the column assembly 10, it is appreciated that in other embodiments the column assembly or other suitable structure can include three or more pieces. As such, the description to follow is understood to illustrate an exemplary implementation and is not meant to limit the present invention in any way.

More generally, it should be understood that embodiments of the present invention are not limited to their use in assembling columns and their corresponding bases and capitals. Rather, other architectural structures, such as domes, can also benefit from the principles discussed herein. In addition, embodiments of the present invention can be employed in connection with other structures and assemblies not related to architectural or building aspects, including pipes, sculptures and body components for automobiles, aircraft and other vehicles.

As shown in FIG. 1A, column alignment assemblies are shown in connection with the mated first and second column portions 12 and 14 and are generally designated at 21A and 21B. Each column alignment assembly 21A and 21B enables mating of the first and second column portions 12 and 14 to one another in order to form the column assembly 10 in a structurally secure and aesthetically superior manner, as will be discussed below.

Reference is now made to FIG. 1B, which depicts in close-up view further details regarding an exemplary column alignment assembly. In particular, column alignment assembly 21A is shown, and though discussion will center around such, it is appreciated that the same principles will apply to the column, base, or other alignment systems described, shown, or mentioned herein.

In further detail, FIG. 1B shows an interface 16 existing between opposing ends of the first and second column portions 12 and 14. Each column portion 12 and 14 further defines an outer column surface 18 and an inner column surface 20.

A first keyed surface 22 is also included as a portion of the column alignment assembly 21A. In the illustrated embodiment, the first keyed surface 22 is defined by a keying material 32, to be described in detail below, positioned on the inner column surface 20 of the second column portion 14. In particular, the keying material 32 on the inner surface 20 of the second column portion 14 is applied in a pliable state and is configured to define a plurality of randomly occurring surface features 24A, shown in FIG. 1B. In the present embodiment the first keyed surface 22 runs the length of the second column portion 14 proximate the interface 16, as implicitly shown in FIG. 1B. However, in other embodiments, the first keyed surface can be limited to specified portions along the column portion length. In one embodiment, the first keyed surface extends approximately four to five inches (10 to 13 centimeters) from the interface 16.

The column alignment assembly 21A further includes a backing member 26 that is attached in the illustrated embodiment to the first column portion 12 at the inner surface 20 thereof. As shown in FIG. 1B, the backing member 26 is attached to the first column portion 12 by an adhesive 50 applied between a portion of the backing member and the column portion inner surface 20. However, in another embodiment the backing member can be integrally formed with the first column portion as a part of the manufacture of the first column portion. Also, though FIG. 1B shows the first keyed surface 22 on the second column portion 14 and the backing member 26 on the first column portion 12, their respective positions can be reversed in other embodiments. Note that the backing member 26 is curved as to at least approximate the curvature of the inner column surface 20. In one embodiment the backing member is approximately four inches (10 cm) wide and ¼ of an inch (0.6 cm) thick The backing member 26 further defines a flange 28 extending across the interface 16 such that it is positioned adjacent the first keyed surface 22 along the length of the second column portion 14. The flange 28 is recessed from the first keyed surface 22 such that a gap 30 is defined between the first keyed surface and the flange surface. The gap 30 provides a space wherein a keying material 32 can be positioned on the flange 28.

In one embodiment, the keying material 32 is placed on the flange 28 before the backing member 26 is attached to the first column portion 26. In another embodiment, the keying material 32 is placed on the flange 28 while the first and second column portions 12 and 14 are separated. Other keying material application scenarios can also be employed. When placed on the flange 28, the keying material 32 is pliable, and it is applied in sufficient quantities on the flange as to enable it to engage the keying material 32 that defines the first keyed surface 22 of the second column portion 14 when the backing member 26 is positioned as shown in FIG. 1B. Further details regarding the engagement of the keying materials are given further below in connection with discussion of a method of the present invention in accordance with one embodiment. Note that the keying material 32 in one embodiment can be used not only for defining one or both keyed surfaces, explained herein, but also for adhesively coupling the backing member to the respective column portion. In yet another embodiment, the keying material can be employed to define one or more of the backing member, the flange, and the first keyed surface, as well as a second keyed surface that is described in detail below.

A separator 36 is placed between the keying materials 32 positioned on the column portion inner surface 20 and the flange 28 before engagement of these components is performed. In one embodiment, the separator 36 is thin mil plastic sheeting and runs along the length of the second column portion 14 to serve as a barrier preventing contact and adhesive bonding between the two keying materials 32 while remaining pliable to enable forming of the keying materials as described below. In other embodiments, a separator having another thickness or composed of materials other than plastic can also be employed. A chemical release liquid or other substance could also be employed. In one embodiment, one end of the separator is attached to a central portion of the backing member 26 so as to hold it in place.

Compressive engagement of the pliable keying material 32 positioned on the second column portion inner surface 20 with the pliable keying material of the flange 28 while pliable enables corresponding surface features to be imprinted into the keying materials, as explained directly below. Thus a sufficient amount of force of the flange 28 against the inner surface of the second column portion 14 is imposed so as to enable this engagement. Such force can be provided in a variety of ways, but in one embodiment mechanical fasteners such as screws (FIG. 2A) can be used.

As mentioned directly above, compressive engagement of the pliable keying materials 32 enables corresponding surface features to be respectively defined in each of the keying materials. In detail, compressive engagement of the pliable keying materials 32, separated by the separator 36, allows random surfaces features, e.g., "hills," "valleys," etc., to form in the keying materials, thereby defining the first keyed surface 22 of the keying material on the second column portion inner surface 20 and a corresponding second keyed surface 34 in the keying material of the flange 28. As such, a surface feature such as a hill defined by the engagement in the first keyed surface 22 corresponds to a valley correspondingly defined by the same engagement in the second keyed surface 34. Again, adhesive bonding between the keying materials 32 is prevented by interposing placement of the separator 36. The keying materials are allowed to set and harden while indirectly engaged with each other, thereby solidifying the first and second keyed surfaces 22 and 34 in the keying materials. In this way, the first keyed surface includes surface features 24A that correspond to, or are "keyed" to, surface features 24B of the second keyed surface 34. As will be seen, the correspondence of the first and second keyed surfaces allows for superior alignment and assembly of the column 10.

In another embodiment, only one of the keying materials may be pliable, while the other is hardened with pre-defined surface features therein prior to engagement of the keying materials. In this case, the pre-defined surface features of the hardened keying material imprint corresponding and inversely matching surface features in the pliable keying material as a result of the compressive engagement. Further, such pre-defined features can be randomly arranged or produced in accordance with a specified pattern.

Though defined above by keying material applied to the column portion inner surface, the first keyed surface can be defined in other embodiments by other means, such as by surface features on the inner column surface itself. In this case, surface features on the column portion inner surface can be randomly generated, such as by inherent characteristics of the column portion manufacturing process, e.g., in cases where the column assembly is manufactured from fiberglass, or by a specified repeated or unrepeated pattern.

The keying material 32 is composed of a mixture of materials that enables the keying material to perform as described above. In one embodiment, the keying material 32 is a thermal set material including a promoter, an oxidizer/catalyst that serves as a catalyst, and a thickener to provide sufficient viscosity for the keying material. Specifically, in one embodiment, the promoter can include cobalt or dimethylaniline ("DMA") included in a polyester resin, the oxidizer/catalyst is organic peroxide, and the thickener is fumed silica. A strengthener, such as milled glass fibers, can also be added to the keying material to provide added strength.

In other embodiments, other materials can be used that suitably perform the functionality of the keying material as described herein. For instance, walnut shells, flour, or other materials could be used as a thickener. Also, acrylics, epoxies, or cementaceous materials could be employed in the place of a thermal set material. In addition, benzoyl peroxide could be employed as the oxidizer/catalyst. These and other alternative keying material formulations are therefore understood to comprise part of the present invention. In any event, the keying material composition can be chosen so as to suitably perform in the environment and conditions in which the column or other structure will be placed.

A spacer 38 is included along the length of the interface 16 of the column assembly to assist in establishing a clean, straight joint between the first and second column portions 12 and 14. In the present embodiment, the spacer 38 is a strip of thin cardboard, but in other embodiments it can be composed of plastic or other suitable material. Desirably, the spacer 38 is rigid enough to preserve a straight boundary along the interface 16, and is non-porous so as not to bind to the filler (described below) that is placed alongside the spacer. In one embodiment, the separator 36 and spacer 38 can be defined by a single piece of material, wherein the single piece is positioned so as to be interposed both between the keying materials 32 and between the first and second column portions 12 and 14 at the interface 16.

The spacer 38 can be inserted into the interface 16 at one of various points in the column assembly process, depending on the particular process followed. In one embodiment, the first and second column portions 12 and 14, having been each separately molded from fiberglass, are first positioned together in the manner shown in FIG. 1A. If needed, the interface 16 is then widened to accommodate placement of the spacer 38 therein. A filler material 40 is then placed on either side of the spacer 38 as needed to fill in the entirety of the interface along the length of the column assembly. Once the filler 40 is set and the rest of the column alignment assembly 21A is complete as described above, the first and second column portions 12 and 14 can be separated, and the spacer 38 removed, in preparation for reassembly of the column assembly 10 around a post or other structure.

In another embodiment, spacer insertion can occur as follows: the column assembly can be initially manufactured as a single component, after which a suitable interface along the length of the column can be defined, depending on such aspects as whether the backing member was integrally formed with the column, for instance. Then, the column assembly can be cut to define the interface and the corresponding first and second column portions. Insertion of the spacer and filler can then proceed as outlined above.

Notwithstanding the above discussion, it is appreciated that the column assembly and corresponding column alignment assemblies can vary from what has been described. For instance, though shown in FIG. 1B as being attached to only one of the column portions, the backing plate can, in one embodiment be separated into two or more segments that are alternatingly attached to the first and second column portions in an adjacent manner along the length of the interface. In such a configuration, the keyed surfaces of the keying materials would necessarily also alternate in conjunction with the backing member so as to provide the interlocking nature of the first and second keyed surfaces.

As mentioned, once the keying materials 32 placed on the second column portion inner surface 20 and the surface of the flange 28 have hardened while engaged with one another to define the first and second keyed surfaces 22 and 34 thereon, the column assembly is in a state wherein the first column portion 12 can be separated from the second column portion 14 in preparation for placing the column assembly around a pre-existing post, for instance, as will be described below.

Reference is now made to FIGS. 2A-2C, which depict various further details of the column assembly 10, according to one embodiment, after preparation and completion of the column alignment assemblies 21A and 21B. In particular, the column assembly includes first and second column portions 12 and 14, together with the column alignment assemblies 21A and 21B and other components, as before described. In addition, the column assembly 10 includes one or more support members 42, positioned about the inner column surface 20 of the column assembly 10. In the present embodiment the support member 42 is positioned as shown in FIG. 2A to provide internal support for the column assembly in order to minimize warping during manufacture, transport, and column placement. However, in other embodiments, such as that shown in FIG. 1A, the support member 42 is not employed. In yet other embodiments, portions of the column assembly 10 along the length of the interface 16 can remain uncut in order to maintain the column portions in a desired orientation with respect to one another. In such a case, the support member 42 need not be used, and placement of the spacer 38 in the interface 16 would wait until the interface is fully cut to define the separate column portions 12 and 14, which cut is usually performed at the worksite immediately before column placement.

In one embodiment, the support member 42 is made from a suitable material, such as wood or plastic, and is annular in shape, having a radius corresponding to that of the inner column surface 20. The support members 42 can be placed at intervals along the length of the column assembly, as partially shown in FIG. 2B, and each includes cutouts 44 that enable the passage of the backing members 26 therethrough. In one embodiment, the support member 42 is made from wood and has a thickness of approximately $7/16$ths of an inch (1.1 cm).

FIGS. 2A-2C further depict various mechanical fasteners, i.e., screws 46, which are positioned in corresponding holes 48 in the column assembly 10. As mentioned above, the screws 46 are employed in cinching the flange 28 of the backing member 26 against the second column portion 14 such that engagement of the keying materials 32 and the corresponding definition of the first and second keyed surfaces 22 and 34 are achieved. As shown in FIG. 2C, one or more screws 46 can be used along the interface 16 to ensure such keyed surface/keying material engagement. In addition, the screws 46 can be used to maintain the column assembly 10 in its assembled state, together with adhesives, once the column assembly is positioned for use in its final location.

In accordance with embodiments of the present invention, a method is disclosed for aligning and assembling structural components, such as the column assembly 10 described above. In a first stage, the column assembly is manufactured and the first and second column portions are defined. In one embodiment, the column assembly is manufactured as a single piece, while in other embodiments the first and second column portions 12 and 14 are separately produced, such as via fiberglass molding or other suitable process. This stage can further include temporarily joining the first and second column portions together via mechanical fasteners, such as screws, to secure the column portions in a fixed relationship to one another. Again, the present method can be applied to other structures in addition to columns. Definition of the first and second column portions also inherently defines the interface 16 between the column pieces.

In a next stage, the backing member 26 is positioned as to span the interface 16 proximate the inner column surface 20 such that its flange 28 is positioned adjacent the region where the first keyed surface 22 will be defined. Though shown here as being attached to the first column portion 12 by an adhesive after manufacture of the first column portion, the backing member 26 in another embodiment can be integrally formed together with the corresponding column portion as part of the manufacturing process.

Now, the first and second keyed surfaces 22 and 34 are defined to correspond and "intermesh" with one another. In the illustrated embodiment, this is achieved by applying the keying material 32 to both the second column portion inner surface 20 and the flange 28, placing the separator 36 between the keying materials, then bringing the keying materials, while in a pliable state, into compressive engagement with one another. Engagement of the pliable keying materials 32, together with the flexible nature of the separator 36, causes the keying materials to randomly and irregularly form to one another, thereby forming corresponding, inversely matching surface features in the keying materials, in turn defining the first and second keyed surfaces 22 and 34. This compressive engagement is maintained, such as by the screws 46, until the keying materials 32 are set and hardened sufficiently to maintain the definition of the first and second keyed surfaces 22 and 34.

Note that the inversely matching surface features of the first and second keyed surfaces in embodiments of the invention can vary in the degree of similarity in corresponding features. For instance, a protrusion, or "hill," on the first keyed surface can correspondingly define a depression, or "valley," in the second keyed surface, thereby forming inversely matching surface features. The degree of matching of such surface features of the first and second keyed surfaces can be approximate or near-exact, depending on the process followed and the particular needs of the application, but in any case the inverse matching of the surface features is sufficient to cooperatively intermesh the first and second keyed surfaces together to provide a unique and correct fit between the column portions or other structure portions that are to be joined.

The intermeshing first and second keyed surfaces described in the previous paragraphs therefore serve as one exemplary means for intermeshing a first structural portion with a second structural portion, such as the first and second column portions discussed herein. Note, however, that other means for intermeshing portions of a multi-portion structural component are also contemplated, including a first keyed surface defined on an inner surface of one of the column portions that intermeshes with the second keyed surface of the flange, for instance. Thus, these and other suitable means are considered part of the present invention.

In the case where the first and second column portions are separately manufactured, definition of the second keyed surface is preceded in one embodiment by attaching the backing member to the corresponding first or second column portion (if the backing member was not integrally formed with the column portion), applying the keying material to the flange of the backing member, and aligning the column portions in a desired orientation with respect to one another, before compressing the keying material against the first keyed surface. In the case where the column assembly is initially manufactured as a single piece without the backing member formed therein, the column assembly can be cut to define first and second column portions, then proceed as in the above case. In either of the two cases above, it is also possible in one embodiment to maintain the column assembly or the column portions together in a desired orientation, apply keying material to the column portion inner surface and the flange of the backing member, then attach the backing member to the corresponding column portion in such as a way as to mutually define the first and second keyed surfaces in the keying materials. These and other variations are therefore contemplated as part of the present invention.

Note again that in the case where both the first keyed surface and the second keyed surface are composed of and defined by keying material, definition of the first and second keyed surfaces occurs simultaneously as both are pliable when compressive engagement between the two surfaces is achieved. Thus, the surfaces, though separated by the separator, define mutual, random surface features as they are pressed together.

In a next stage, and if not yet performed before, the spacer 38 (FIG. 1B) is placed in the interface 16, which can be widened by a cutting procedure, as explained above. Placement of the spacer 38 is followed by filling any remaining gaps at the interface 16 with the filler 40, as shown in FIG. 1B. The spacer 38 can remain in place until final positioning and assembly of the column assembly is performed. Alternatively, the spacer 38 can be removed beforehand, if desired.

Upon completion of the above stages, the column alignment assemblies, such as the column alignment systems 21A and 21B of the column assembly 10 shown in FIG. 2A are completed, thereby enabling placement and final assembly of the column assembly, such as around a post on a building or other structure. This is done by first separating the first and second column portions 12 and 14 from one another, and removing both the spacer 38 from the interface 16 and the separator 36 from between the first and second keyed surfaces 22 and 34. Note that, in one embodiment, the first and second column portions 12 and 14 can have portions of the interface 16 that remain uncut from the column manufacturing process. If this is the case, those portions must first be cut to enable separation of the first and second column portions.

An adhesive is then applied to the first and second column portions. Locations 50 for the placement of the adhesive can best be seen in FIG. 1B. These adhesive placement locations 50 include the inner column surface 20 of the first column portion 12 and the region between the first and second keyed surfaces 22 and 34. The adhesive can be one of various suitable adhesives, but in one embodiment the adhesive is thermal set adhesive. In one embodiment, the thickness of the separator 36 is selected in part so as to provide adequate volume for a sufficient amount of thermal set adhesive to be positioned between the first and second keyed surfaces 22 and 34, thereby ensuring proper adhesion between the two surfaces when they are joined. In other words, the thickness of the separator 36 creates a small separation between the first and second keyed surfaces 22 and 34 during the formation phase of these surfaces, described above. Thus, when the separator 36 is later removed, a void equaling the thickness of the separator is preserved between the first and second keyed surfaces 22 and 34. This void can then be filled with adhesive, such as thermal set adhesive, which requires a sufficient amount to be present to enable proper thermal setting for good bonding.

Once the adhesive is properly applied, the two column portions 12 and 14 can be fitted around the post or other structure, if present. The two column portions 12 and 14 are then re-joined, intermeshing the first keyed surface 22 with the second keyed surface 34 along the length of the column assembly 10 in a unique fit that ensures the proper and desired orientation of the first and second column portions with respect to one another. The screws 46 can then be reinserted, if desired, to solidify the attachment between the column portions. The holes 48 for the screws 46 can also be used to verify that proper alignment between the first and second column portions 12 and 14 has been achieved. Alternatively, the screws 46 can be omitted from the column assembly 10, and the holes 48 instead filled with a suitable filler material. FIGS. 2B and 2C respectively illustrate interior and exterior views of a portion of the column assembly after final assembly is complete.

Figure 3A:
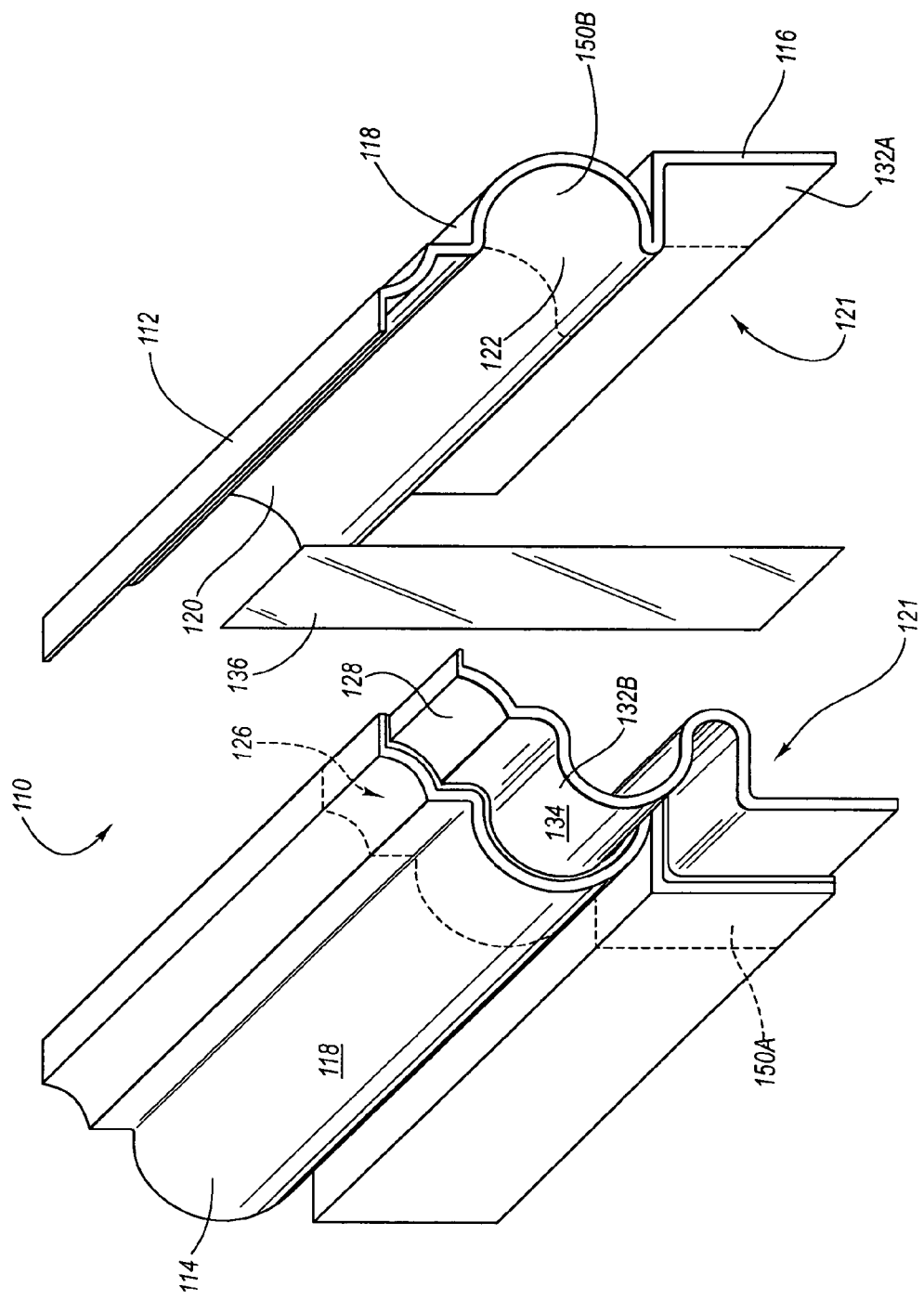
FIG. 3A is a perspective view of a architectural base assembly in a disassembled state and including an alignment and attachment system, according to one embodiment.
Figure 3C:
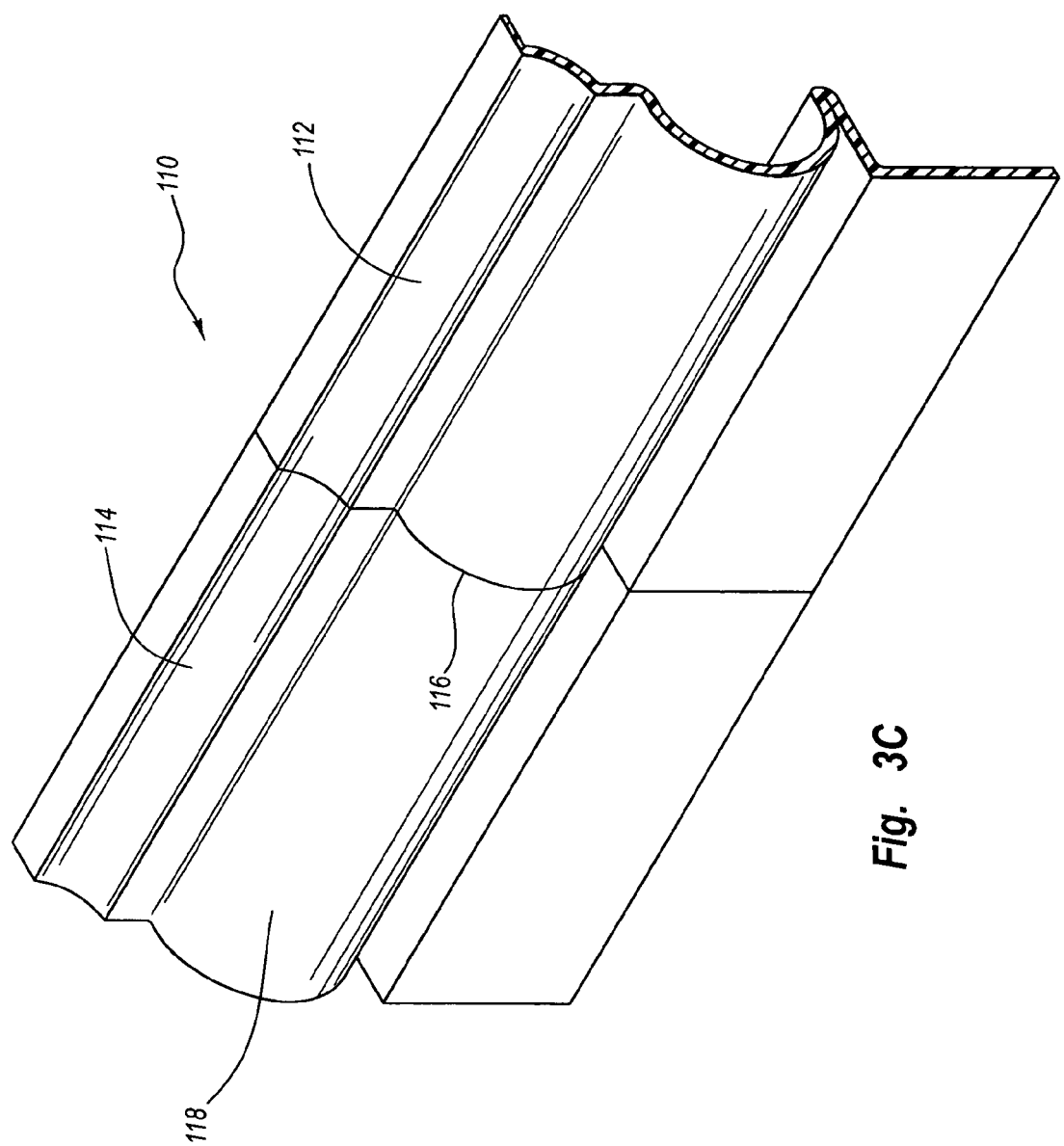
FIG. 3C is a perspective view of a portion of an architectural base assembly in an assembled state, having an alignment and attachment system, according to one embodiment.

Reference is now made to FIGS. 3A-3C. As mentioned, embodiments of the present invention can be used on structures and assemblies in addition to columns. FIGS. 3A-3C illustrate an example of such an alternative application, wherein a base assembly, generally designated at 110, is shown for use with a corresponding column assembly, such as the column assembly 10 previously discussed. It is noted that the base 110 and its manner of assembly shares many common aspects with the column assembly 10 already discussed. As such, only selected details regarding the base 110 and its manner of assembly will be discussed below.

In detail, the base assembly 110 is hollow, and includes first and second base halves 112 and 114 defining an interface 116 therebetween. The first and second base halves 112 and 114 both define an outer base surface 118 and an inner base surface 120. The base assembly 110 further includes a base alignment assembly, generally designated at 121. The base alignment assembly 121 includes various components, as before. In particular, a first keyed surface 122 is defined by keying material 132A positioned on the inner base surface 120 of first base half 112. This can be seen most clearly in FIG. 3B, which shows cross sectional views of the first and second base halves 112 and 114 in an assembled state during which the first keyed surface 122 and a second keyed surface (discussed below) are being defined. Note that in other embodiments the first keyed surface is not defined by a keying material, but rather by surface features naturally existing or formed on the inner base surface of the first base half, as was the case with the column assembly 10 of FIGS. 1A-2C.

A backing member 126 including a flange 128 is positioned adjacent the interface 116 and is attached to the second base half 114. Additional keying material 132B is positioned on the flange 128 and is brought into indirect contact with the keying material 132A, being separated by a separator 136, and secured by compressive engagement. Compressive interaction between the two masses of keying material 132A and 132B creates unique, intermeshing surfaces that form the corresponding first keyed surface 132A proximate the inner base surface 120 of the first base half 112 and a second keyed surface 134 on the backing member flange 128. Once sufficiently hardened, the pieces can be separated for installation about a post or other structure. Alternatively, the first keyed surface 122 can have defined therein surface features that are allowed to set before the keying material 132B of the flange 128 is brought into compressive engagement. In such a case, the keying material 132B is imprinted with the surface features of the first keyed surface 122B. Also, though not shown the base assembly 110 can further include a spacer and filler at the interface 116 to ensure a clean, linear joint between the first and second base halves 112 and 114.

The cross sectional shape of the backing member 126 in the present embodiment conforms to the cross sectional shape of the base assembly 110, as best seen in FIG. 3B. This corresponding shape enables the first and second keyed surfaces 122 and 134 to properly form against one another in preparation for final base assembly. In one embodiment, this is accomplished by forming a flexible piece of fiberglass that is saturated with a catalyzed polyester resin to serve as the backing member 126, against the inner base surface 120 and allowing the piece set to a rigid state having a shape that corresponds to the shape of the inner column surface. The backing member 126 is then removed from the second base half 114, adhesive applied to the backing member 126 at location 150A, and the backing member is reapplied to the second base half as shown in FIG. 3A. Definition of the first and second keyed surfaces 122 and 134 can then proceed as described herein.

When reassembled, the first and second base halves 112 and 114 are secured together using an adhesive at adhesive location 150B indicated in FIG. 3A, after removing the separator 136. The joint region of the final, assembled base assembly 110 appears as shown in FIG. 3C. A similar structure and method is followed in forming a column capital and various architectural and other structures, in accordance with embodiments of the present invention.

It should be noted that the steps recited herein can be performed in an order different from that explicitly described herein, as may be appreciated by one skilled in the art.

Reference is now generally made to FIGS. 4A-11 in describing various details regarding yet further embodiments of the present architectural component alignment system. To the extent that elements of the following embodiments are similar to those elements already described above, further extensive details regarding such elements will not be given. As such, only selected features of embodiments of the present invention are discussed below.

More particularly, FIGS. 4A-6B depict column portions of a column assembly having various surface feature configurations in accordance with one exemplary embodiment. In detail, FIGS. 4A and 4B show a portion of a column assembly, generally designated at 210, including column halves 212 and 214. An interface 216 is defined between and extends along the axial length of the column halves 212 and 214.

The column assembly 210 further includes a column alignment system 221 configured in accordance with the present embodiment. The column alignment system 221 includes a first keyed surface 222 that defines surface feature 224. The first keyed surface 221 in the present embodiment is included on a flange 228 of a backing member 226 that is attached to the column half 212, in a fashion similar to previous embodiments.

In greater detail, the surface feature 224 of the first keyed surface 222 is implemented in the present embodiment as a "U"-shaped trough that extends along at least a portion of the length of the flange 228 in the axial direction of the column assembly 210. As will be seen, however, the trough-shaped surface feature 224 is merely one example of the variety of predetermined non-random surface features that can be employed in connection with embodiments of the present invention. Surface features on the first keyed surface 222 are considered predetermined as they are pre-defined with respect to other surface features of the column alignment system, such as those located on a second keyed surface, to be described below. Surface features of the first keyed surface 222 are considered non-random as they have a specified shapes and configuration and are not formed as a result of chance.

In the present embodiment, the trough-shaped surface feature 224 is defined directly into the material, such as wood, fiberglass, etc., of which the flange 228 is composed. In other embodiments, however, a keying material similar to the keying material discussed above can be placed on the flange and the surface feature(s) can be defined in the keying material before the keying material is hardened, thereby durably defining the surface feature(s) therein. Also note that the surface feature 224 can be defined on the flange 228 either before or after the backing member 226 is attached to the column half 212.

Correspondingly, a second keyed surface 234 is defined on the column half 214 and includes a surface feature 225. The surface feature 225 is defined in a keying material 232, such as the keying material discussed in previous embodiments. The keying material 232 is included on a mating surface 214A, which is a portion of an inner surface of the column half 214 that is adjacent to the flange 228 when the column halves 212 and 214 are mated.

The surface feature 225 of the second keyed surface 234 is correspondingly shaped with respect to the surface feature 224 located on the first keyed surface 222. In particular, the surface feature 225 in the present embodiment defines a "U"-shaped protrusion, or half-cylinder, that extends along the second keyed surface 234 in the axial direction of the column halves 212 and 214.

The U-shaped hill of the surface feature 225 is formed in the present embodiment as a result of engagement with the U-shaped surface feature 224 of the first keyed surface 222. In detail, before mating of the column halves is performed, the keying material 232 is applied in a pliable state and in sufficient quantities to the second keyed surface 234. The column half 214 is then brought into contact with the flange 228 whereon the surface feature 224 of the first keyed surface 222 is already durably defined. Care is taken to ensure that the column halves 212 and 214 are properly aligned with respect to one another at this stage. Sufficient compressive engagement between the first and second keyed surfaces 222 and 234 is established such that the keying material 232 of the second keyed surface conforms to the shaped imprinted therein by the first keyed surface. A flexible separator (not shown) may be placed between the first and second keyed surfaces 222 and 234 before compression to avoid adhesion between the flange 228 and the column half 214.

The first and second keyed surfaces 222 and 234 are maintained in a compressive mated configuration until the surface feature 225 is sufficiently and durably defined in the second keyed surface 234. The column half 214 can then be separated from the flange 228. The first and second keyed surfaces 222 and 234 are now uniquely keyed to one another with inversely matching surfaces, i.e., the surface features 224 and 225, respectively, and are therefore capable of cooperatively intermeshing to bring the column halves 212 and 214 of the column assembly 210 into desired alignment with one another when again mated, as in previous embodiments. In this way, the column alignment system 221 enables the column halves 212 and 214 to be mated and suitably aligned with one another during column installation using pre-defined, non-random surface features. Note that in one embodiment the column assembly includes first and second column alignment systems for joining each pair of ends of two column halves together.

Note that while the present and following embodiments are directed to use with columns, it is appreciated that the same principles can also be applied to other structures in which components thereof are to be mated in precise alignment one with another. Non-limiting examples of such other structures includes architectural bases and capitals that are often installed together with columns in architectural settings, square posts, non-cylindrical columns, etc.

Reference is now made to FIGS. 5A and 5B, which depict various details regarding another example embodiment of the present invention. In detail, the column alignment system 221 shown in FIGS. 5A and 5B includes first and second keyed surfaces 222 and 234 having surface features configured in contrast to that shown in FIGS. 4A and 4B, according to the present embodiment. Specifically, the first keyed surface 222 of the flange 228 includes a plurality of surface features 324, wherein each surface feature defines a recessed U-shaped half-cylinder trough that extends along the length of the flange 228 in the axial direction of the column assembly 210. A corresponding plurality of protruding U-shaped half-cylinder surface features 325 are defined in the keying material 232 of the second keyed surface 234 of the column half mating surface 214A. The surface features 325 are defined by engagement of the keying material 232, while pliable, with the surface features 324 as explained in connection with FIGS. 4A and 4B so as to produce an inversely matching relationship between each set of surface features. So configured, the surface features 324 of the first keyed surface 222 can cooperatively intermesh with the surface features 325 of the second keyed surface 234 when the column halves 212 and 214 are mated with one another, thereby ensuring a precise fit therebetween.

While the embodiment shown in FIGS. 4A and 4B includes one surface feature of each keyed surface, the embodiment shown in FIGS. 5A and 5B includes a plurality of such surface features on each keyed surface. As such, the number and type of predetermined, non-random surface features can vary from what is shown and explicitly described herein while still residing within the claims of the present invention.

Figure 6A:
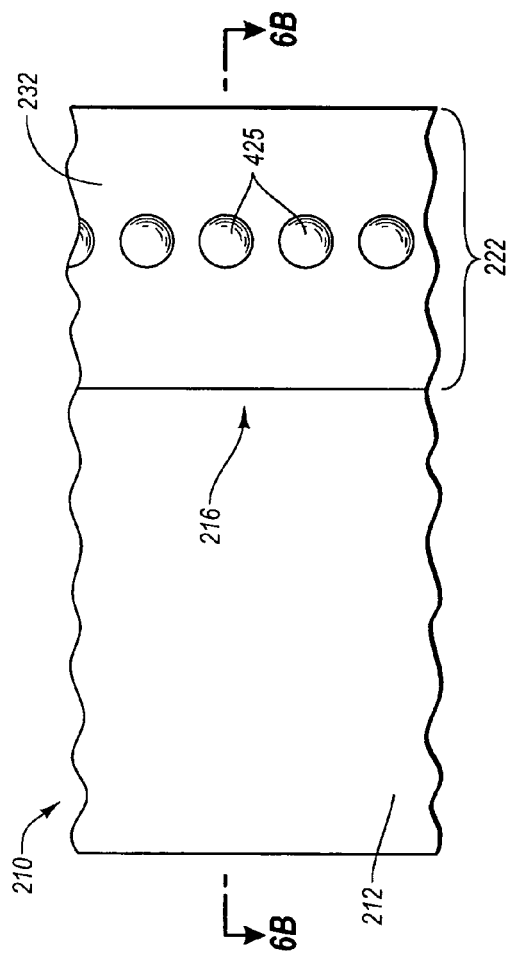
FIG. 6A is a side view of a portion of a column assembly including features according to yet another embodiment of the present invention.
Figure 6B:
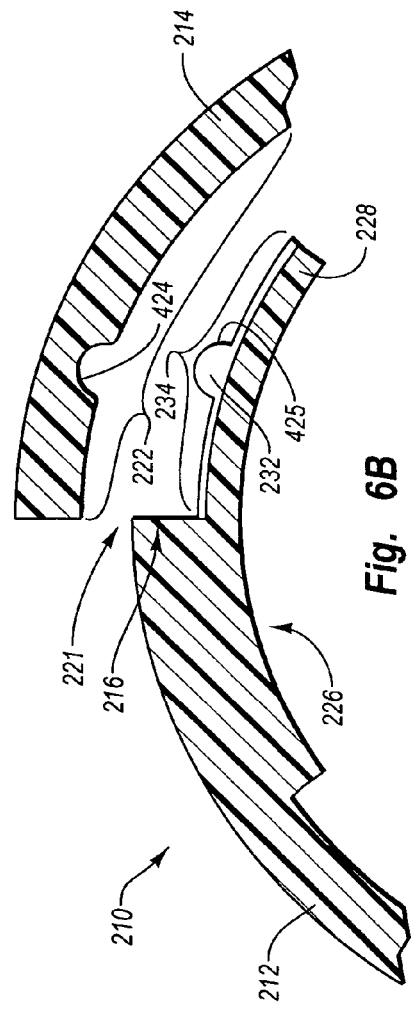
FIG. 6B is a cross sectional view of a portion of the column assembly, taken along the line 6B-6B of FIG. 6A.

As another example of the intermeshing surface features possible, reference is now made to FIGS. 6A and 6B, which depict the column alignment system 221 according to yet another exemplary embodiment. In detail, the first keyed surface 222 is shown, but is positioned on the column half 214, not on the flange 228 of the backing member 226. The first keyed surface 222 includes a plurality of recessed hemispherical surface features 424 extending in linear alignment along the length of the column half 214. The surface features 424 are defined directly in the material of which the column half 214 is composed, though in other embodiments a keying material can be employed on the first keyed surface 222 to define the surface features.

Correspondingly, the second keyed surface 234 is positioned on the flange 228 and includes extended hemispherical surface features 425 defined in the keying material 232. The surface features 425 are defined by engagement of the keying material 232, while pliable, with the surface features 424 as explained in connection with FIGS. 4A and 4B so as to produce an inversely matching relationship between each set of surface features. So configured, the surface features 424 of the first keyed surface 222 can cooperatively intermesh with the surface features 425 of the second keyed surface 234 when the column halves 212 and 214 are mated with one another, thereby ensuring a precise fit therebetween. Note that the present embodiment as depicted in FIGS. 6A and 6B illustrates the fact that the surface feature(s) can be composed of few or many features extending along the length of the keyed surfaces in order to facilitate a precise fit between the mated column halves.

Note that in the present embodiment, the recessed hemispherical surface features 424 are used in defining the extended hemispherical surface features 425. However, in other embodiments, surface features that extend from the respective keyed surface can be used to define recessed surface features, essentially inverting the configuration described in the embodiments shown in FIGS. 4A-6B.

FIG. 6B also shows that the backing member 226 having the flange 228 is integrally formed with the column half 212, as opposed to merely connected thereto, as shown in FIGS. 4A-5B. This and other backing member configurations are therefore contemplated as comprising part of the present invention.

Figure 7:
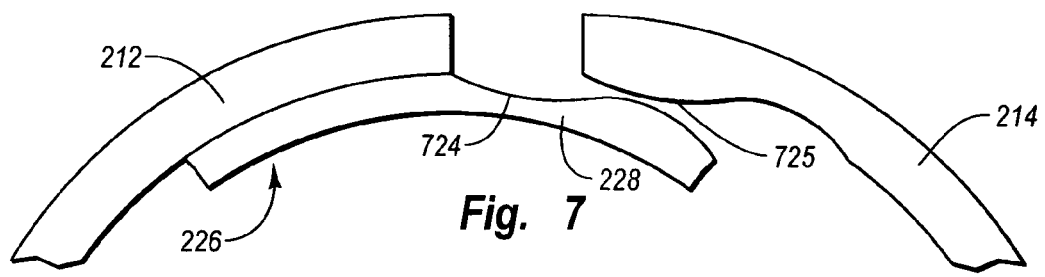
FIGS. 7-10 depict various alternative configurations for surface features that can be included in a column alignment system according to embodiments of the present invention.

Reference is now made to FIGS. 7-10, which depict various additional and exemplary surface feature configurations that can be employed in a column alignment system to precisely align and mate column halves or other suitable structures, according to yet further embodiments of the present invention. In particular, FIG. 7 shows a continuous, wave-like surface feature 724 defined on the flange 228, together with its corresponding surface feature 725 on the column half 214.

Figure 8:
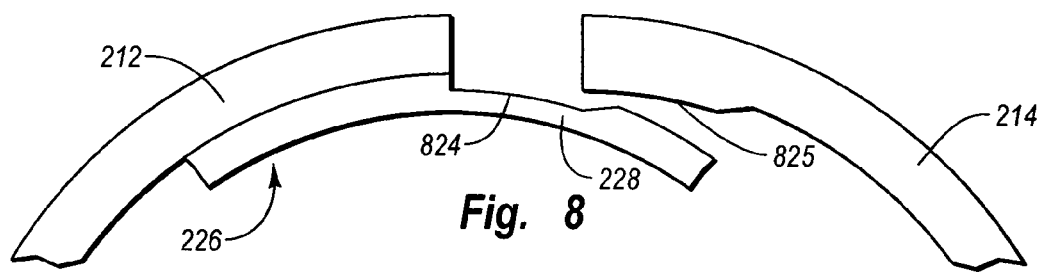

FIG. 8 depicts a bi-level surface feature 824 having a slanted transition, and corresponding surface feature 825.

Figure 9:
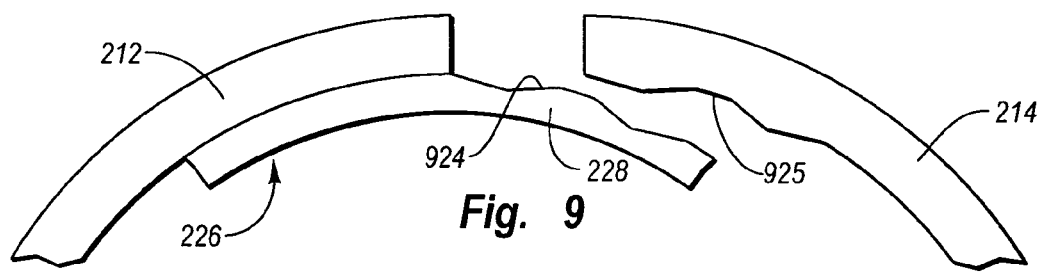
Figure 10:
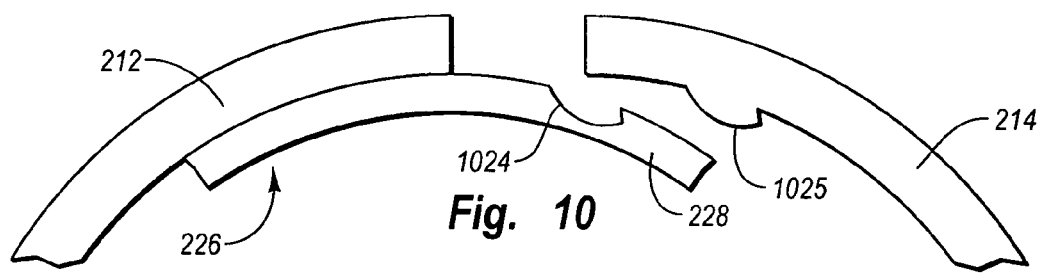

FIG. 9 shows angled and indented surface features 924, together with corresponding surface features 925 on the column half 214. Finally, FIG. 10 depicts a recessed notch surface feature 1024 on the flange 228, a protruding surface feature 1025 on the column half 214 to correspond thereto. The surface features 1024 and 1025 represent one example of interlocking surface features that can partially assist in maintaining the column halves 212 and 214 in a mated condition.

Note that, while not explicitly shown, each of the surface features depicted in FIGS. 7-10 extends in one embodiment along the length of the respective surface in the axial direction of the column assembly or other component on which the alignment system is disposed. As such, inversely matching surface features that cooperatively intermesh with one another are formed on the column halves to be joined, thereby resulting in a precisely aligned mating of the column halves to form the complete column assembly.

The present invention may be embodied in other specific forms without departing from its spirit or essential characteristics. The described embodiments are to be considered in all respects only as illustrative, not restrictive. The scope of the invention is, therefore, indicated by the appended claims rather than by the foregoing description. All changes that come within the meaning and range of equivalency of the claims are to be embraced within their scope.

What is claimed is:

1. A multi-piece structural component, comprising:
a first structural portion and a second structural portion that together define an interface, the first structural portion including at least one predetermined surface feature on a flange;
a second structural portion that includes a backing member and a mating surface, the mating surface including a keying material that defines at least one surface feature, the at least one surface feature being defined as a result of compressive engagement of the keying material with the at least one predetermined surface feature, the surface features cooperatively intermeshing with one another when the first and second structural portions are mated with ends of the first and second structural portions abutting against each other to form the interface, the backing member conforming to inner surfaces of the first and second structural portions and spanning the interface from the first structural portion to the second structural portion such that a desired alignment between the first and second structural portions is achieved.

2. The multi-piece structural component as defined in claim 1, wherein the flange and the mating surface are substantially adjacent the interface when the first and second structural portions are mated.

3. The multi-piece structural component as defined in claim 1, wherein the predetermined surface feature of the flange is a recessed surface feature, and wherein the surface feature defined in the keying material is a protruding surface feature.

4. The multi-piece structural component as defined in claim 1, wherein the surface features cooperatively define a recessed and indented surface feature and a correspondingly shaped surface feature.

5. A column assembly, comprising:
a first column portion including a first keyed surface on which at least one predetermined surface feature is defined;
a second column portion including a backing member and a second keyed surface configured to engage the first keyed surface, wherein the second keyed surface includes at least one surface feature that intermeshes with the at least one predetermined surface feature such that the first and second column portions are desirably aligned when mated with ends of the first and second column portions abutting against each other to form an interface, the backing member conforming to inner surfaces of the first and second column portions and spanning the interface from the first column portion to the second column portion.

6. The column assembly as defined in claim 5, wherein the at least one predetermined surface feature is non-randomly defined.

7. The column assembly as defined in claim 5, wherein the second keyed surface includes a keying material, and wherein the at least one surface feature is defined in the keying material.

8. The column assembly as defined in claim 7, wherein the at least one surface feature of the second keyed surface is defined in the keying material as a result of compressive engagement of the keying material with the at least one predetermined surface feature.

9. The column assembly as defined in claim 5, wherein the surface features interlock with one another when the first and second column portions are mated.

10. The column assembly as defined in claim 5, wherein the first keyed surface is included on a flange of the first column portion, and wherein the second keyed surface is included on a mating surface of the second column portion.

11. The column assembly as defined in claim 10, wherein the first column portion includes a first flange and a second flange, each flange having first keyed surface, and wherein the second column portion includes a first mating surface and a second mating surface, each mating surface having a second keyed surface, wherein the first flange engages the first mating surface, and wherein the second flange engages the second mating surface.

12. The column assembly as defined in claim 5, wherein the first and second keyed surfaces are defined in a keying material.

13. The column assembly as defined in claim 5, wherein the first keyed surface is included on a mating surface of the first column portion, and wherein the second keyed surface is included on a flange of the second column portion.

* * * * *